US008532453B2

(12) United States Patent
Sorimachi et al.

(10) Patent No.: US 8,532,453 B2
(45) Date of Patent: Sep. 10, 2013

(54) HIGH VOLTAGE CABTIRE CABLE

(75) Inventors: Masami Sorimachi, Hitachi (JP); Yoshiaki Nakamura, Hitachi (JP); Takenori Taki, Hitachi (JP); Hirotaka Yoshida, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 258 days.

(21) Appl. No.: 13/026,389

(22) Filed: Feb. 14, 2011

(65) Prior Publication Data

US 2011/0200289 A1 Aug. 18, 2011

(30) Foreign Application Priority Data

Feb. 12, 2010 (JP) ................................ 2010-029299

(51) Int. Cl.
*G02B 6/44* (2006.01)

(52) U.S. Cl.
USPC .......................................... 385/101; 174/68.1

(58) Field of Classification Search
USPC .................................. 385/78, 101; 174/68.1
See application file for complete search history.

(56) References Cited

U.S. PATENT DOCUMENTS

| | | | | |
|---|---|---|---|---|
| 4,767,168 | A * | 8/1988 | Grandy | 385/53 |
| 5,136,673 | A * | 8/1992 | Yoshizawa et al. | 385/103 |
| 5,408,560 | A * | 4/1995 | Seynhaeve et al. | 385/101 |
| 6,239,379 | B1 * | 5/2001 | Cotter et al. | 174/110 R |
| 2002/0097966 | A1 * | 7/2002 | Zelesnik | 385/100 |
| 2009/0003780 | A1 * | 1/2009 | Bringuier et al. | 385/113 |
| 2010/0209056 | A1 * | 8/2010 | Chaudhary et al. | 385/100 |

FOREIGN PATENT DOCUMENTS

| | | | |
|---|---|---|---|
| EP | 310271 | A1 * | 4/1989 |
| JP | 6-52728 | A | 2/1994 |
| JP | 2008-21456 | A | 1/2008 |

* cited by examiner

*Primary Examiner* — Charlie Peng
*Assistant Examiner* — Peter Radkowski
(74) *Attorney, Agent, or Firm* — Foley & Lardner LLP

(57) ABSTRACT

A high voltage cabtire cable 10 includes power cores 20 each of which has an inner semi-conductive layer 22, an insulation 23, and an outer semi-conductive layer 24 successively provided in this order around a copper conductor 21, and other cores 25, 30 stranded together with the power core 20, an inner sheath 11 and an outer sheath 13 successively provided in this order around peripheries of the power core 20 and the other cores 25, 30 stranded together, in which an adhesion force between the other cores 25, 30 and the inner sheath 11 is greater than an adhesion force between the power cores 20 and the inner sheath 11.

6 Claims, 1 Drawing Sheet

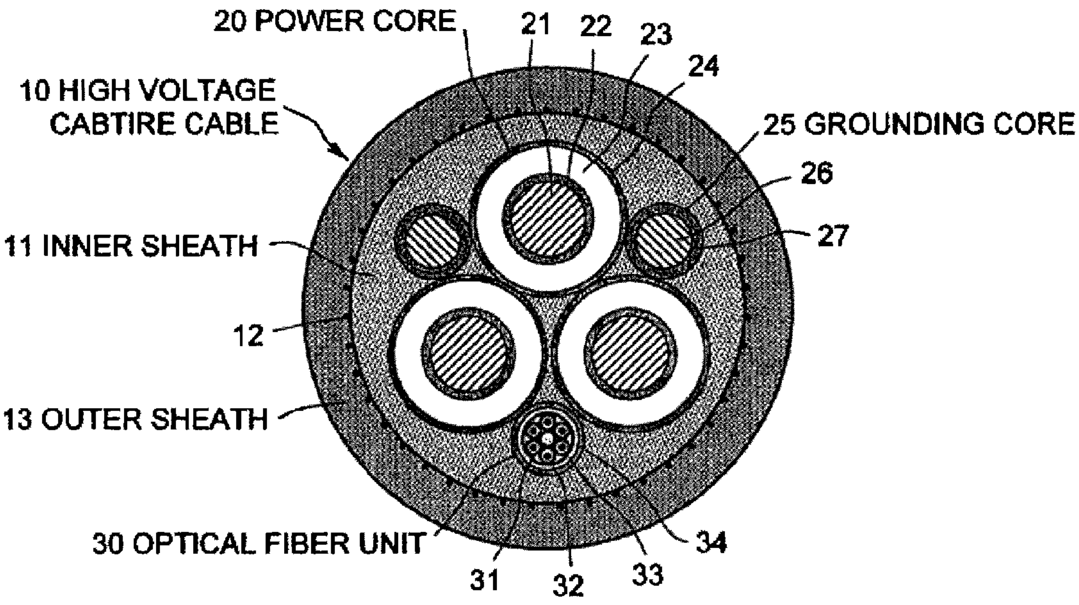
20 POWER CORE
21
22
23
24
10 HIGH VOLTAGE CABTIRE CABLE
25 GROUNDING CORE
26
27
11 INNER SHEATH
12
13 OUTER SHEATH
30 OPTICAL FIBER UNIT
31
32
33
34

HIGH VOLTAGE CABTIRE CABLE

The present application is based on Japanese Patent Application No. 2010-029299 filed on Feb. 12, 2010, the entire contents of which are incorporated herein by reference.

BACKGROUND OF THE INVENTION

1. Field of the Invention

The present invention relates to a high voltage cabtire cable to be used for power feeding for mobile devices, more particularly, to a high voltage cabtire cable in which adhesion property between power cores and other cores is improved when the power cores and other cores are coated with an inner sheath.

2. Related Art

The "cabtire cable" is also called as "cabtyre cable", the name of which is derived from "cab tire", since this kind of cables are as tough as "car tires" in mobile application. The "cabtire cable" is a kind of a flexible cable e.g. a rubber-sheathed flexible cable in which a core such as power core is coated with an insulation and further jacketed with a flexible but tough material such as hard rubber.

The high voltage cabtire cable is formed by stranding (twisting) a plurality of power cores and other cores, coating outer peripheries of the stranded power cores and other cores with an inner sheath, and jacketing the coated cores with an outer sheath. Recently, as the other cores to be stranded (twisted) together with the power cores, an optical fiber unit for use in communication control is stranded (twisted) together as well as grounding cores.

The power core is formed by providing an insulation around a conductor. For achieving electric characteristics stability, conductive layers (semi-conductive layers) are provided around the conductor and the insulation respectively. Namely, the conductive layers (semi-conductive layers) are provided between the conductor and the insulation, and on the insulation. Materials and characteristics of respective conductive layers are varied depending on the kind of the cabtire cable and its service voltage. In general, a semi-conductive fabric tape, extrusion-type semi-conductive rubber, extrusion-type semi-conductive plastic, etc. are used as the conductive layer.

This type high voltage cabtire cable is used for high voltage power supply to the mobile devices such as crane and elevator. The high voltage cabtire cable is used in a severe environment, in which the cable is subjected to inflection and twisting as well as strokes and frictions in a pulley or reel, etc. repeatedly.

Accordingly, it is preferable that the insulation and the semi-conductive layer (hereinafter referred to as "inner semi-conductive layer") provided directly around the conductor of the power core are bonded strongly to each other for the use of the cabtire cable. In general, there will be no problem if the inner semi-conductive layer and the insulation are made from similar materials (i.e. materials in the same series). The inner semi-conductive layer is formed by a method of winding a tape including a base fabric of staple fiber coated with conductive butyl rubber, or a method of extruding semi-conductive EP rubber (EPR: Ethylene Propylene Rubber), semi-conductive butyl rubber (IIR: Isobutylene-Isoprene Rubber), or the like.

On the other hand, for a semi-conductive layer to be provided on the insulation of the power core (hereinafter referred to as "outer semi-conductive layer"), appropriate adhesion property (i.e. adhesion force) and appropriate separation property (generally called as "free-strip property") are required with considering electrical characteristics and easiness in terminal processing when using the cable. Accordingly, the semi-conductive layer provided by extrusion is selected rather than a semi-conductive layer provided by winding the tape.

Japanese Patent Laid-Open No. 6-52728 (JP-A 6-52728) proposes the use of nitrile rubber (NBR: Nitrile-Butadiene Rubber) as a base resin composition for a semi-conductive layer used as the outer semi-conductive layer.

Japanese Patent Laid-Open No. 2008-21456 (JP-A 2008-21456) discloses a high voltage cabtire cable in which an inner sheath made of a blended material of chlorinated polyethylene (CM, also called as CPE), ethylene copolymers, and EP rubber, and an outer sheath made of a chloroprene rubber (CR) are provided. In JP-A 2008-21456, only a plurality of power cores are stranded together.

Further, in a cable configuration in which the power cores as well as other cores such as a grounding core and an optical fiber unit are stranded together, the same material as that of the outer semi-conductive layer, i.e. the NBR based conductive material is used for a coating material of the grounding core, so as to reduce a grounding resistance. Still further, as a material for a sheath of the optical fiber unit, materials having required properties for maintaining desired characteristics are selected appropriately.

On the other hand, as to materials for an inner sheath and an outer sheath for coating a stranded core formed by stranding the power cores, the grounding cores, the optical fiber unit and the like, characteristics such as abrasion-resistance property, oil-proof property, high hardness are compatibly required. Therefore, a base material such as chloroprene rubber (CR), chlorinated polyethylene (CM), chlorosulfonated polyethylene (CSM), etc. are generally used for the material of the inner or outer sheath.

SUMMARY OF THE INVENTION

However, the base material for the inner or outer sheath does not have a good affinity with the materials such as NBR provided around the power cores, the grounding core and the optical fiber unit. Therefore, there is a disadvantage in that the adhesion property (cohesion property) with the inner sheath cannot be expected.

As described above, when the cabtire cable is used, the cabtire cable is subjected to the inflection and twisting as well as strokes and frictions in a pulley or reel, etc. repeatedly, so that respective cores in the cable slowly move and twisting of each core turns back to a untwisted state (called as "laughing" in this field). As a result, the whole cable undulates like a snake, so that malfunction (e.g. the cable is not property settled in the reel) may occur. In addition, the conductor may be broken or disconnected when the degree of undulation of the cable is so high (remarkable).

On the contrary, when the adhesion (cohesion) between the outer semi-conductive layer material and the inner sheath material is too strong, the outer semi-conductive layer and the inner sheath are bonded (cohered) to each other too tightly. As a result, even though the grounding core and the optical fiber unit are not influenced largely, there are disadvantages in that it is difficult to separate (strip) the power cores from the outer semi-conductive layer in the terminal processing and that a surface smoothness of the power core cannot be obtained even if the power cores are stripped off from the outer semi-conductive layer, so that the electric characteristics may be deteriorated and electrical malfunction may occur.

Accordingly, an object of the present invention is to solve the aforementioned problems and to provide a high voltage cabtire cable, in which an inner sheath provided around peripheries of the power cores and other cores such as the grounding core and the optical fiber unit that are stranded together by extrusion coating can be appropriately bonded (cohered) only to the grounding core and the optical fiber unit.

According to a feature of the invention, a high voltage cabtire cable comprises:

power cores each of which comprises an inner semi-conductive layer, an insulation, and an outer semi-conductive layer successively provided in this order around a copper conductor;

other cores stranded together with the power cores; and an inner sheath and an outer sheath successively provided in this order around peripheries of the power cores and the other cores stranded together, in which an adhesion force between the other cores and the inner sheath is greater than an adhesion force between the power cores and the inner sheath.

The other cores may comprise a grounding core and an optical fiber unit.

It is preferable that the outer semi-conductive layer of each of the power cores comprises nitrile-butadiene rubber based material, the grounding core comprises a conductive coating layer comprising a chloride polymer, the optical fiber unit comprises a binder tape provided around an outer periphery of an outer sheath of the optical fiber unit, the binder tape comprises a single-sided rubber-coated fabric tape, and the inner sheath comprises a chloride polymer.

The chloride polymer may be selected from the group consisting of chlorinated polyethylene, chlorosulfonated polyethylene, and chloroprene rubber.

It is preferable that the power cores comprises three power cores stranded together, in which each of the other cores are accommodated in a space between adjacent ones of the power cores stranded together.

According to another feature of the invention, a flexible cable comprises:

a power core comprising an inner semi-conductive layer, an insulation, and an outer semi-conductive layer successively provided in this order around a copper conductor;

an other core stranded together with the power core; and an inner sheath and an outer sheath successively provided in this order around peripheries of the power core and the other core stranded together, in which an adhesion force between the other core and the inner sheath is greater than an adhesion force between the power core and the inner sheath.

(Points of the Invention)

According to the present invention, a high voltage cabtire cable includes an inner sheath provided around peripheries of the power cores and other cores such as the grounding cores and the optical fiber unit that are stranded together, and an adhesion force between the inner sheath and the other cores such as the grounding core and the optical fiber unit is greater than an adhesion force between the power cores and the inner sheath. Therefore, the inner sheath can be appropriately bonded (cohered) only to the grounding cores and the optical fiber unit. According to this structure, it is possible to strip the inner sheath from the power cores in the terminal processing relatively easily. Further, it is possible to provide a high voltage cabtire cable which hardly undulates even though the cabtire cable is subjected to the inflection and twisting as well as strokes and frictions in a pulley or reel, etc. repeatedly when using the cabtire cable, since the inner sheath is tightly bonded to the grounding core and the optical fiber unit.

BRIEF DESCRIPTION OF THE DRAWING

Next, a high voltage cabtire cable in an embodiment according to the invention will be explained in conjunction with appended drawing, wherein:

FIG. 1 is a cross-sectional view of a high voltage cabtire cable in an embodiment according to the invention.

DETAILED DESCRIPTION OF THE EMBODIMENT

Next, the embodiment according to the present invention will be explained below in more detail in conjunction with appended drawing.

(Total Structure of a High Voltage Cabtire Cable)

Referring to FIG. 1, a total structure of a high voltage cabtire cable in the embodiment according to the present invention will be explained below.

A high voltage cabtire cable (i.e. a flexible cable) 10 includes power cores 20 each of which has an inner semi-conductive layer 22, an insulation 23, and an outer semi-conductive layer 24 successively provided in this order around a copper conductor 21, and other cores 25, 30 stranded together with the power core 20, an inner sheath 11 and an outer sheath 13 successively provided in this order around peripheries of the power cores 20 and the other cores 25, 30 stranded together, in which an adhesion force between the other cores 25, 30 and the inner sheath 11 is greater than an adhesion force between the power cores 20 and the inner sheath 11. Herein, the "power core" is a coated core wire for power feeding and the "grounding core" is a coated core wire for grounding.

Referring to FIG. 1, the high voltage cabtire cable 10 is formed by twisting (stranding) a plurality of power cores 20 as well as grounding cores 25 and an optical fiber unit 30 as the other cores to provide a stranded core, coating the inner sheath 11 around outer peripheries of the stranded power cores and the other cores (more specifically, an outer periphery of the stranded core), providing a buried (embedded) braid as a reinforcing layer 12 around an outer periphery of the inner sheath 11, and coating the outer sheath 13 around an outer periphery of the reinforcing layer 12 as a jacket.

(Power Core 20)

Each of the power cores 20 is formed by extrusion-coating and vulcanizing an inner semi-conductive layer comprising a semi-conductive layer containing ethylene propylene rubber (EPR) based material doped with a conductive material (carbon black), an EP rubber insulation 23, and an outer semi-conductive layer 24 comprising a semi-conductive layer containing NBR based material doped with a conductive material (carbon black) successively (or simultaneously for plural layers) around a copper conductor 21.

(Grounding Core 25)

Each of the grounding cores 25 is formed by extrusion-coating and vulcanizing a conductive coating layer 27 containing a conductive chloride polymers doped with a conductive material (carbon black) around a copper conductor 26.

(Optical Fiber Unit 30)

The optical fiber unit 30 is formed by stranding optical fibers 32 around a high-tension steel wire 31, providing an outer sheath 33 made from a material using chloroprene rubber (CR) as a base material around an outer periphery of the stranded optical fibers 32 by extrusion-coating, wrapping a binder tape 34 around the outer sheath 33, and vulcanizing the outer sheath 33.

(Stranded Core)

Simultaneously with stranding three power cores 20, two grounding cores 25 and one optical fiber unit 30 are stranded together such that the two grounding cores 25 and the one optical fiber unit 30 are respectively accommodated in respective spaces between adjacent power cores 20, to provide a stranded core. Outer peripheries of the three power cores 20, the two grounding cores 25 and the one optical fiber unit 30 (i.e. an outer periphery of the stranded core) are coated with the inner sheath 11 comprising a chloride polymer by extrusion-coating. Successively, a buried braid is provided as a reinforcing layer 12 around an outer periphery of the stranded core coated with the inner sheath 11, and the outer sheath 13 is provided as a jacket around an outer periphery of the inner sheath 11, to provide the high voltage cabtire cable 10.

(Total Configuration)

In the present invention, by utilizing the configuration in which the grounding cores 25 and the optical fiber unit 30 are arranged between the respective power cores 20, strong adhesion is provided between the inner sheath 11 and the cores other than the power cores 20 i.e. the grounding cores 25 and the optical fiber unit 30. According to this structure, it is possible to prevent the stranded core comprising the power cores 20, the grounding cores 25, and the optical fiber unit 30 from turning back to the untwisted state, while maintaining the easiness in terminal processing of the power cores 20.

Further, in the present invention, the configuration of the high voltage cabtire cable is not limited to a configuration in which two grounding cores 25 and one optical fiber unit 30 are provided. It is also possible to adopt a configuration in which a plurality of optical fiber units 30 are accommodated between the adjacent power cores 20. Further, for example, a lengthy member other than the optical fiber unit 30, for example, pipe, tube, control core, coaxial cable core for communication may be used, as long as the cohesion property between the power cores 20 and the lengthy member accommodated between the adjacent power cores 20 can be maintained.

In addition, the number of the power cores 20 may be one or more.

(Combination of Materials for Respective Layers)

In the present invention, the NBR based material is used for the outer semi-conductive layer 24 of the power core 20. Chloride polymers (e.g. CR, CM, and CMS) may be used for the material of the conductive coating layer 27 of the grounding core 20. A single-sided rubber-coated fabric tape is used as the binder tape for wrapping the outer layer of the optical fiber unit 30. Chloride polymers (e.g. CR, CM, and CMS) may be used for the inner sheath 11.

In the outer sheath 33 of the optical fiber unit 30, a material using chloroprene rubber (CR) is generally adopted as a base material. When vulcanizing the outer sheath 33 made of CR at a high temperature, there is a problem in that optical loss is increased due to heat contraction of composing materials of the optical fiber 32. Therefore, after extrusion coating of a CR layer as the outer sheath 33, the binder tape 34 is wrapped around the CR layer for the outer sheath 33 so as to prevent the deformation. Thereafter, the outer sheath 33 is vulcanized by warm water or warm air at a low temperature for about 2 days. Therefore, the cohesion between the optical fiber unit 30 and the inner sheath 11 is provided by retaining the binder tape 34 without stripping it off from the optical fiber unit 30.

The fabric tape for the binder tape 34 is configured to be coated with rubber at one side (single side). Another side which is not coated with rubber is adhered to the inner sheath 11. By using woven fabric or nonwoven fabric for the non-rubber-coated side, the inner sheath 11 intrudes into the tape, so that the inner sheath 11 is adhered to the binder tape 34 by the anchoring effect. In particular, the use of the nonwoven fabric is preferable since the adhesion property is better than the other fabrics, since a surface of the nonwoven fabric is less smooth (i.e. provided with a lot of concave-convexo portions) than a surface of the woven fabric.

Therefore, the inner sheath 11 and the grounding cores 25 as well as the optical fiber unit 30 are tightly bonded (cohered) to each other. As a result, it is possible to provide a high voltage cabtire cable which hardly undulates even though the cabtire cable is subjected to the inflection and twisting as well as strokes and frictions in a pulley or reel, etc. repeatedly.

Next, the material for the outer semi-conductive layer 24 of the power core 20 and the conductive chloride polymers for the conductive coating layer 27 of the grounding core 20 will be explained below in more detail.

The NBR for the base material of the outer semi-conductive layer 24 is copolymerized rubber of acrylonitrile (AN) and butadiene (BR) which is classified into plural groups from low nitrile to super nitrile according to AN content (low nitrile: <25%, medium nitrile: 25 to 31%, high nitrile: 36 to 43%, super nitrile: 43%<). Herein, solubility parameter (SP value) is widely used as an index showing the polarity of polymer. SP value of NBR is within a range of 17.6 to 21.5 $MP^{1/2}$ while SP value of EP rubber is within a range of 16.0 to 17.5 $MP^{1/2}$. It is confirmed that the SP value is increased in accordance with the increase of the AN content in NBR (namely, higher nitrile), and the compatibility with EP rubber of the NBR is decreased in accordance with increase in the SP value. NBR of all grades can be used for the base material of the outer semi-conductive layer 24 and can be selected appropriately in accordance with desired mechanical property, electrical property, workability or the like. NBR is not excellent in ozone-proof property due to double bond included in a main chain of butadiene component. So as to solve this problem, the ozone-proof property may be improved by using a high nitrile product (with less butadiene content), adding ozone-proof inhibitor, and using "hydrogenated NBR (HNBR)" from which the double bond is excluded by hydrogenation.

NBR may be used alone or blended with other materials. When NBR is used alone, the medium nitrile type NBR is preferable, since it is easy to control the cohesion property and the free-strip property with the EP rubber.

As materials to be blended with NBR, polar polymers such as polyvinyl chloride (PVC), chlorinated polyethylene (CN), chlorosulfonated polyethylene (CSM) and chloroprene rubber (CR) may be used. By blending these materials with NBR, it is possible to improve the aforementioned ozone-proof property, heat-resistant property, cold-proof property or the like of NBR.

Non-polar polymer such as EP rubber, BR (butadiene), isobutylene-isoprene rubber (IIR), isoprene (IR) and natural rubber (NR) that are not excellent in compatibility may be used, if a blending content thereof is small. In particular, it is possible to improve the aforementioned ozone-proof property and the heat proof property by blending the EP rubber.

As the chloride polymers to be used for the base material of the semi-conductive coating layer 27 of the grounding core 20 and the chloride polymers to be used for the inner sheath 11, chlorinated polyethylene (CM), chlorosulfonated polyethylene (CSM), chloroprene rubber (CR) or the like may be used.

Chlorinated polyethylene (CM) is polyethylene chlorinated in water, and the molecular weight and crystalline property thereof reflect the properties of its raw materials. The property of CM is varied from plastic type to rubber type in accordance with degree of chlorination. Certain products of CM contain a small amount of remained crystals. All kinds of the chlorinated polyethylene as described above may be used, and CM with chlorination degree of 30 to 40% is particularly suitable for the aforementioned purpose.

Chlorosulfonated polyethylene (CSM) is obtained by simultaneous chlorination and chlorosulfonation by blowing chloride gas and sulfur dioxide gas into polyethylene. Rubber elastic property of CSM is varied in accordance with chlorination degree similarly to CM. CSM with chlorination of 25 to 43% and sulfur content of about 0.1% has been manufactured. Even more particularly, products of alkylated CSM are also commercialized for specific purposes, but a detailed structure thereof is not described here. All kinds of CSM as described above may be used for the aforementioned purpose.

Chloroprene rubber (CR) is classified into W-type (non sulfo-modified) and G-type (sulfo-modified). As brands of products of CR, WWM-1, WHV, WRT, WXJ, WD, WB, WK, GN, GNA, GS, GRT, GT, etc. are commercialized, and all of these products may be used for the aforementioned purpose.

As conductivity-imparting agent, conductive carbon such as "Ketjenblack" (trademark, high conductive carbon black) and acetylene black is suitable since even a small amount of the conductive carbon can impart the electrical conductivity. Furthermore, other fine particle carbon black may be used together with the conductive carbon black appropriately. In addition, by using the polar NBR as the base rubber, there is an advantage in that a doping amount of the carbon black for imparting the electrical conductivity is less than that for imparting the electrical conductivity to the non-polar polymer. Since the viscosity of a compound can be suppressed, the polar NBR is particularly excellent in extrusion processing property.

As to the binder tape 34 to be used for the optical fiber unit 30, single-sided adhesive polynosic tape, single-sided adhesive staple fiber muslin tape, single-sided adhesive cotton tape, single-sided adhesive polyester (e.g. "Tetoron" (trademark)) tape and the like may be used. For the rubber material to be used in the adhesive tapes, natural rubber or isobutylene-isoprene rubber may be used. When using the single-sided adhesive tape as the binder tape 34, the single-sided adhesive tape is wound around the outer sheath 33 of the optical fiber unit 30 such that an adhesive side faces and comes into contact to the outer sheath 33 which is not yet vulcanized of the optical fiber unit 30.

As to the fibers to be used for the buried braid, staple fiber, nylon, "Kevlar" (trademark, para-aramid fiber), "Vectran" (trademark, polyarylate), "Tetoron" (trademark, polyester), "Nomex" (trademark, meta-aramid fiber) and the like may be used. Diameter of the fiber may be chosen appropriately depending on condition of braiding process, cable size and the like.

As to other compounding agents to be commonly used for the NBR outer semi-conductive layer material, the conductive chloride polymers and the inner sheath material, e.g. anti-aging agent, lubricant, compounding oil, ozone-proof inhibitor, ultraviolet rays inhibitor, fire retardant, filler, antistatic agent, and tackifier (tacking agent) may be doped appropriately in accordance with required properties. Any of the above materials should be cross-linked for the use. As to cross-linking methods, sulfur vulcanization, peroxide cross-linking, metallic oxide vulcanization, or the like may be selected in accordance with each base polymer, required properties, processing method and the like.

EXAMPLES

Next, Examples of the present invention and comparative examples will be explained below.

TABLE 1 shows experimental results of combination of respective materials in Examples 1 to 4 and comparative examples 1 to 3, and TABLE 2 shows detailed compounding ratio of respective materials in Examples 1 to 4 and comparative examples 1 to 3.

TABLE 1

<table>
<tr><th colspan="3" rowspan="3">Items</th><th colspan="7">Examples</th></tr>
<tr><th colspan="4">Example</th><th colspan="3">Comparative example</th></tr>
<tr><th>1</th><th>2</th><th>3</th><th>4</th><th>1</th><th>2</th><th>3</th></tr>
<tr><td rowspan="6">Cable Structure</td><td rowspan="3">Power Core</td><td>Inner semi-conductive layer</td><td colspan="7">EP rubber</td></tr>
<tr><td>Insulation</td><td colspan="7">EP rubber</td></tr>
<tr><td>Outer semi-conductive layer</td><td colspan="7">NBR</td></tr>
<tr><td colspan="2">Grounding core coating layer</td><td>CR</td><td>CR</td><td>CR</td><td>CM</td><td>CM</td><td>EP rubber</td><td>CR</td></tr>
<tr><td colspan="2">Inner sheath</td><td>CM</td><td>CR</td><td>CSM</td><td>CM</td><td>NBR</td><td>CM</td><td>EP rubber</td></tr>
<tr><td colspan="2">Outer sheath</td><td colspan="7">CR</td></tr>
<tr><td rowspan="5">Properties</td><td colspan="2">Stripping force between the outer semi-conductive layer and the inner sheath (N)</td><td>10~12</td><td>10~13</td><td>9~11</td><td>12~14</td><td>Not stripped</td><td>18~21</td><td>11~13</td></tr>
<tr><td colspan="2">Stripping force between the grounding core and the inner sheath (N)</td><td>29~34</td><td>30~36</td><td>28~37</td><td>33~41</td><td>11~14</td><td>9~13</td><td>12~15</td></tr>
<tr><td colspan="2">Surface smoothness of the outer semi-conductive layer after stripping the inner sheath</td><td>Good</td><td>Good</td><td>Good</td><td>Good</td><td>Not stripped</td><td>Good</td><td>Good</td></tr>
<tr><td colspan="2">Cable twisting test</td><td>Good</td><td>Good</td><td>Good</td><td>Good</td><td>Good</td><td>Undulated</td><td>Undulated</td></tr>
<tr><td colspan="2">Total evaluation</td><td>○</td><td>○</td><td>○</td><td>○</td><td>X</td><td>X</td><td>X</td></tr>
</table>

EP: Ethylene propylene rubber
NBR: Nitrile-Butadiene rubber
CR: Chloroprene rubber
CM: Chlorinated polyethylene
CSM: Chlorosulfonated polyethylene

TABLE 2

| Materials | | Items | | | | | | | | | | | |
|---|---|---|---|---|---|---|---|---|---|---|---|---|---|
| | | Power core | | | | | | | | | | | |
| | | Inner semi-conductive layer | Insulation | Outer semi-conductive layer | Grounding core Coating layer | | | Inner sheath | | | | | Outer sheath |
| | | EP | EP | NBR | CR | CM | EP | CM | CR | CSM | NBR | EP | CR |
| EP rubber | *1 | 100 | 100 | — | — | — | 100 | — | — | — | — | 100 | — |
| NBR | *2 | — | — | 100 | — | — | — | — | — | — | 100 | — | — |
| CR | *3 | — | — | — | 100 | — | — | — | 100 | — | — | — | — |
| | *4 | — | — | — | — | — | — | — | — | — | — | — | 100 |
| CM | *5 | — | — | — | — | 100 | — | 100 | — | — | — | — | — |
| CSM | *6 | | | | | | | | | 100 | | | |
| Stabilizer/ | *7 | 4 | 5 | 5 | 5 | | 4 | | 5 | | 5 | 5 | 5 |
| Vulcanizer | *8 | | | | 4 | | | | 4 | 10 | | | 4 |
| Stabilizer | *9 | | | | | 10 | | 10 | | | | | |
| | *10 | | | | | 4 | | 4 | | | | | |
| Processing aid | *11 | | | | | 2 | | 2 | | | | | |
| Anti-aging | *12 | | | | 2 | | | | 2 | 2 | | | 1.5 |
| agent | *13 | 1 | 1 | 1.5 | | | 1 | | | | 1.5 | 1 | |
| | *14 | | 0.5 | 1 | | | | | | | 1 | 0.5 | |
| Compounding | *15 | | | | 15 | | | | 10 | | | | 8 |
| Oil | *16 | 20 | 2 | | | | 20 | | | | | 8 | |
| (Plasticizer) | *17 | | | 40 | | | | | | | 30 | | |
| | *18 | | | | | 35 | | 35 | | 18 | | | |
| Lubricant | *19 | | 0.5 | 1 | 3 | 1 | | 1 | 3 | 2 | 1 | 1 | 4 |
| | *20 | 1 | 0.5 | 2 | 2 | | 1 | | 1 | 1 | 2 | 0.5 | 2 |
| Filler | *21 | | 55 | | | | | | | 20 | | | 80 |
| | *22 | | | | | | | | 20 | | | | |
| Carbon black | *23 | | | | | | | 40 | 40 | 30 | 40 | 40 | |
| | *24 | | | | | | | | | | | | 20 |
| | *25 | 65 | | | 65 | 65 | 65 | | | | | | |
| | *26 | | | 42 | | | | | | | | | |
| Vulcanizer | *27 | | | 1.5 | | | | | | | 1.5 | | |
| (Cross-linking | *28 | | | 2 | | | | | 0.5 | | 2 | | |
| agent) | *29 | | | | | | | | 1 | | | | |
| Accelerator | *30 | | | | | | | | | | 3 | | |
| | *31 | | | | | | | | | 1.5 | | | |
| | *32 | | | | | | | | | | | | 0.8 |
| | *33 | 2.5 | 2 | | | 2 | 2.5 | 2 | | | | 2 | |

(Parts by weight)

*1: "EP3045" manufactured by Mitsui Chemicals, Inc., ethylene content 56%, the third component ENB4.5%, Mooney viscosity $ML_{1+4}$ 100° C. (40)

*2: "Nipol DN219" manufactured by Zeon Corporation, AN bond amount 33.5%, Mooney viscosity $ML_{1+4}$ 100° C. (40)

*3: "Showprene (Showa Denko Chloroprene) W"

*4: "Showprene (Showa Denko Chloroprene) GS"

*5: "Elaslen401A" manufactured by Showa Denko K.K., Chlorination rate 40%, Mooney viscosity $ML_{1+4}$ 121° C. (115)

*6: "TS-530" manufactured by Tosoh Corporation, Chlorination rate 35%, Sulfur content 1%, Mooney viscosity $ML_{1+4}$ 100° C. (56)

*7: Zinc oxide grade 3

*8: Magnesia

*9: Lead sulfate tribasic

*10: Epoxydized soybean-oil

*11: TMPT (trimethylolpropane tri-(meta-) acrylate)

*12: "AntageDDA"

*13: "Antage3C"

*14: "AntageMB"

*15: Naphthenic oil, Aniline point 73° C., Ring analysis % ($C_A$16.2, $C_N$37.0, $C_P$42.8)

*16: Paraffin oil, Aniline point 127° C., Ring analysis % ($C_A$0, $C_N$29.0, $C_P$71.0)

*17: DOP (Dioctyl phthalate)

*18: "Chlorinated paraffin 40"

*19: Paraffin wax, melting point 135° F.

*20: Stearic acid

*21: Talc

*22: Light calcium carbonate, average particle diameter 2.6 μm, oil absorption 0.32 cc/g

*23: FEF carbon

*24: HAF carbon

*25: Acetylene black

*26: Ketjenblack EC

*27: Sulfur

*28: CZ

*29: "ACCEL #22"

*30: TT

*31: TRA

*32: DM

*33: DCP

Example 1

Firstly, referring to TABLE 2, base materials of the inner semi-conductive layer, insulation, and outer semi-conductive layer of the power core were kneaded by an intensive mixer. Thereafter, EP rubber based material for the inner semi-conductive layer, EP rubber material for the insulation, and NBR based material for the outer semi-conductive layer were extruded simultaneously for three layers at temperature of 100° C., 90° C. and 100° C. respectively, around a copper conductor with a nominal sectional area of 35 $mm^2$ by an extruder (EXT). The three layers were simultaneously cross-linked (vulcanized) by steam, to provide a power core (outer diameter of about 17.4 mm).

Next, referring to TABLE 2, CR based materials for the coating layer of the grounding core were kneaded by an intensive mixer. Thereafter, the CR rubber based conductive material for the coating layer of the grounding core was extrusion-coated at temperature of 85° C. around a copper conductor with a nominal sectional area of 16 $mm^2$ by an extruder (EXT). Thereafter, the CR rubber based conductive material for the coating layer was cross-linked (vulcanized), to provide a coating layer (outer diameter of about 5.5 mm), similarly to the power core.

Further, the optical fiber unit was manufactured by providing CR based material for the outer sheath as shown in TABLE 2 by extrusion-coating around outer peripheries of stranded fiber cores, wrapping a tape around the outer sheath for preventing cohesion, and vulcanizing the outer sheath at low temperature (80° C. for 4 days). The tape was not stripped and remained around the CR based outer sheath after the vulcanization of the outer sheath (outer diameter of the optical fiber unit was about 8.4 mm).

The tape used for the binder tape was a single-sided natural rubber adhesive polynosic tape.

Three power cores, two grounding cores and one optical fiber unit manufactured as described above were stranded together as explained referring to FIG. 1 to have an outer diameter of about 37.4 mm. CM based inner sheath material was coated by the extruder (EXT) around outer peripheries of the power cores, grounding cores and optical fiber unit that are stranded together. Thereafter, the material for the inner sheath was not vulcanized and a buried braid made of Kevlar was provided on the inner sheath as a reinforcing layer. Thereafter, CR based outer sheath material was provided around the braid of Kevlar by extrusion-coating at temperature of 80° C. Then, the inner sheath material and the outer sheath material were simultaneously cross-linked (vulcanized) by high pressure steam, to provide a predetermined cable having an outer diameter of about 44 mm (6 kv, 3×35 SQ, high voltage cabtire cable).

Example 2

A high voltage cabtire cable was manufactured similarly to Example 1 except the inner sheath material was changed to CR based material as shown in TABLE 2.

Example 3

A high voltage cabtire cable was manufactured similarly to Example 1 except the inner sheath material was changed to CSM based material as shown in TABLE 2.

Example 4

A high voltage cabtire cable was manufactured similarly to Example 1 except the coating layer material of the grounding core was changed to CM based material as shown in TABLE 2.

Comparative Example 1

A high voltage cabtire cable was manufactured similarly to Example 1 except the inner sheath material was changed to NBR based material as shown in TABLE 2.

Comparative Example 2

A high voltage cabtire cable was manufactured similarly to Example 1 except the coating layer of the grounding core was changed to EP rubber based material as shown in TABLE 2.

Comparative Example 3

A high voltage cabtire cable was manufactured similarly to Example 1 except the inner sheath material was changed to EP rubber based material as shown in TABLE 2.

Respective properties shown in TABLE 1 of the high voltage cabtire cables manufactured as described above were evaluated.

(Evaluation of Stripping Force (N))

The stripping force (separation force) between the outer semi-conductive layer of the power core and the inner sheath and the stripping force between the grounding core and the inner sheath were measured as follows (the number of times for measurement n=3).

A sample of the inner sheath cohered to the outer semi-conductive layer of the power core and the grounding core was cut from each of the high voltage cabtire cables. The sample was cut to have a width of about half (½) inch and a length of 15 cm. The stripping force of each sample was measured at tension speed of 50 mm/min. by Tensilon type tensile strength testing machine.

(Surface Smoothness of the Outer Semi-Conductive Layer)

The surface smoothness of the outer semi-conductive layer of the power core after stripping the inner sheath was evaluated by visual inspection. The sample, in which the inner sheath did not remain without bonding or the inner sheath could be removed by hand relatively easily, was evaluated as (○). The sample, in which the inner sheath could not removed easily due to the strong bonding, was evaluated as (x).

(Cable Twisting Test)

The cable twisting test was carried out by a specified testing machine as follows. The cable having an effective length of 3 m was installed vertically to the testing machine and a load of 10 kgf was hung at a lower limit of the cable. The cable was rotated at ±360° for 100000 times at a rate of 15 times/min. After the cable twisting test, the cable was left at a horizontal place and appearance of the cable was visually inspected. Thereafter, the cable was disassembled, and each of the power cores, grounding cores, and optical fiber unit was examined. The cable that was hardly undulated in which each core did not "laugh" (turn back to the untwisted state) was evaluated as "Good".

(Total Evaluation)

The reference values for the stripping force (separation force) between the outer semi-conductive layer of the power core and the inner sheath and the stripping force between the grounding core and the inner sheath were approximately 15N or less and 25N or more, respectively. However, the result of the cable twisting test was given priority to the result of the stripping force, and acceptance (○) and rejection (x) were totally evaluated.

In the aforementioned test, CR was used for the coating layer of the grounding core for all of Examples 1 to 3. Further, CM, CR, and CSM were used for the inner sheath material in Examples 1 to 3, respectively. Still further, CM was used for both of the coating layer of the grounding core and the inner sheath in Example 4. CR was used for the outer sheath in all of Examples 1 to 4.

In each of Examples 1 to 4, as clearly shown in TABLE 1, the cohesion of the inner sheath with the power core was slight. The surface smoothness of the outer semi-conductive layer after stripping the inner sheath was good. Further, it is confirmed that the inner sheath was tightly bonded to the grounding core. In addition, there was no undulation in the twisting test of the cable and the evaluation was good. The total evaluation was ○ for all of Examples 1 to 4.

On the other hand, in comparative example 1, although there is no undulation of the cable in the twisting test of the cable, the outer semi-conductive layer and the inner sheath were strongly bonded to each other, since both of the materials of the outer semi-conductive layer of the power core and the inner sheath were NBR. Therefore, the interface separation was not achieved and a part of the outer semi-conductive layer was broken.

Further, in comparative example 2, the separation strength (stripping force) between the outer semi-conductive layer and the inner sheath was higher than 15N, and the separation strength (stripping force) between the grounding core and the inner sheath was not greater than 25N. Although the surface of the outer semi-conductive layer was smooth, the cable undulated.

In comparative example 3, the separation strength (stripping force) between the outer semi-conductive layer and the inner sheath was 15N or less, while the separation strength (stripping force) between the grounding core and the inner sheath was not greater than 25N. Although the surface of the outer semi-conductive layer was smooth, the cable undulated.

As described above, in all of Examples 1 to 4, no change such as undulation of the cable was found. After disassembling the cable, status of each core was examined. As a result, the separation between the power core and the inner sheath was partially observed. However, great changes such as separation from the grounding core and the optical fiber unit were not found.

In comparative example 1, no change was observed. However, since the outer semi-conductive layer and the inner sheath were not separated from each other, the total evaluation was x.

In comparative examples 2 and 3, the cable began to show signs of undulation in accordance with progress of the twisting test. According to evaluation result of each core after disassembling the cable, the "laughing" of each power core was partially remarkable. Further, it is confirmed that the grounding cores were stripped from the inner sheath although the optical fiber unit was adhered to the inner sheath to some extent.

Although the invention has been described, the invention according to claims is not to be limited by the above-mentioned embodiments and examples. Further, please note that not all combinations of the features described in the embodiments and the examples are not necessary to solve the problem of the invention.

What is claimed is:

1. A high voltage cabtire cable comprising:

power cores each of which comprises an inner semi-conductive layer, an insulation, and an outer semi-conductive layer successively provided in this order around a copper conductor;

other cores stranded together with the power cores, the other cores comprising a grounding core and an optical fiber unit; and an inner sheath and an outer sheath successively provided in this order around peripheries of the power cores and the other cores stranded together, wherein an adhesion force between the other cores and the inner sheath is greater than an adhesion force between the power cores and the inner sheath, wherein the outer semi-conductive layer of each of the power cores comprises nitrile-butadiene rubber based material, the grounding core comprises a conductive coating layer comprising a chloride of polymer, the optical fiber unit comprises a binder tape provided around an outer periphery of an outer sheath of the optical fiber unit, the binder tape comprises a single-sided rubber-coated fabric tape, and the inner sheath comprises a chloride polymer, wherein the inner sheath is bonded to the grounding core and the optical fiber unit, and wherein the single-sided rubber coated fabric tape comprises one side coated with rubber and an other side which is not coated with the rubber and is bonded to the inner sheath.

2. The high voltage cabtire cable according to claim 1, wherein the chloride polymer is selected from the group consisting of chlorinated polyethylene, chlorosulfonated polyethylene, and chloroprene rubber.

3. The high voltage cabtire cable according to claim 1, wherein the power cores comprise three power cores stranded together, wherein each of the other cores are accommodated in a space between adjacent ones of the power cores stranded together.

4. A flexible cable comprising:

a power core comprising an inner semi-conductive layer, an insulation, and an outer semi-conductive layer successively provided in this order around a copper conductor;

an other core stranded together with the power core, the other cores comprising at grounding core and an optical fiber unit; and an inner sheath and an outer sheath successively provided III this order around peripheries of the power core and the other core stranded together, wherein an adhesion force between the other core and the inner sheath is greater than an adhesion force between the power core and the inner sheath, wherein the outer semi-conductive layer of each of the power cores comprises nitrile-butadiene rubber based material, the grounding core comprises a conductive coating layer comprising a chloride polymer, the optical fiber unit comprises a binder tape provided around an outer periphery of an outer sheath of the optical fiber unit, the binder tape comprises a single-sided rubber-coated fabric tape, and the inner sheath comprises a chloride polymer, wherein the inner sheath is bonded to the grounding core and the optical fiber unit, and wherein the single-sided rubber coated fabric tape comprises one side coated with rubber and an other side which is not coated with the rubber and is bonded to the inner sheath.

5. The high voltage cabtire cable according to claim 1, wherein the inner sheath intrudes into the single-sided rubber coated fabric tape.

6. The flexible cable according to claim 1, wherein the inner sheath intrudes into the single-sided rubber coated fabric tape.

* * * * *